United States Patent

[11] 3,602,613

| [72] | Inventors | Rush B. Gunther<br>Abington;<br>Robert C. Wolf, Hatboro, both of, Pa. |
|---|---|---|
| [21] | Appl. No. | 861,025 |
| [22] | Filed | Sept. 25, 1969 |
| [45] | Patented | Aug. 31, 1971 |
| [73] | Assignee | The Duriron Company, Inc.<br>Hatboro, Pa. |

[54] HIGH PRESSURE PUMP
5 Claims, 2 Drawing Figs.

[52] U.S. Cl............................................. 417/437,
92/156, 277/15
[51] Int. Cl............................................. F04b
[50] Field of Search............................................. 92/156,
158, 159, 160, 86; 184/24, 5, 100; 277/15, 135;
417/437

[56] References Cited
UNITED STATES PATENTS

| 1,850,614 | 3/1932 | Aisenstein | 277/15 |
| 1,851,395 | 3/1932 | MacArthur | 277/15 |
| 2,257,011 | 9/1941 | Hillier | 184/24 |
| 2,347,296 | 4/1944 | Starr | 277/135 |
| 2,572,952 | 10/1951 | Rymal | 277/15 |
| 3,106,099 | 10/1963 | Jeffrey et al. | 277/15 |
| 3,176,996 | 4/1965 | Barnett | 277/15 |
| 3,414,274 | 12/1968 | Aronson | 277/15 |

Primary Examiner—Martin P. Schwadron
Assistant Examiner—Clemens Schimikowski
Attorney—Zachary T. Wobensmith, 2nd ABSTRACT: A high-pressure pump is provided operating in a range from 50,000 p.s.i. to 100,000 p.s.i. but which is useful down to 3,000 p.s.i. in which packings at moving parts are eliminated and seal bushings are used, one toward the process fluid side and the other toward the atmosphere with a lubricating type fluid compatible with the fluid being pumped introduced between the bushings and tending to flow in both directions along the plunger. The pressure of the source of fluid is adjusted to control the clearance at the bushings. Static seals are provided at the outboard ends of each of the bushings to prevent the flow of the fluid except at the clearance locations. The leakage into the system and to the atmosphere is very small.

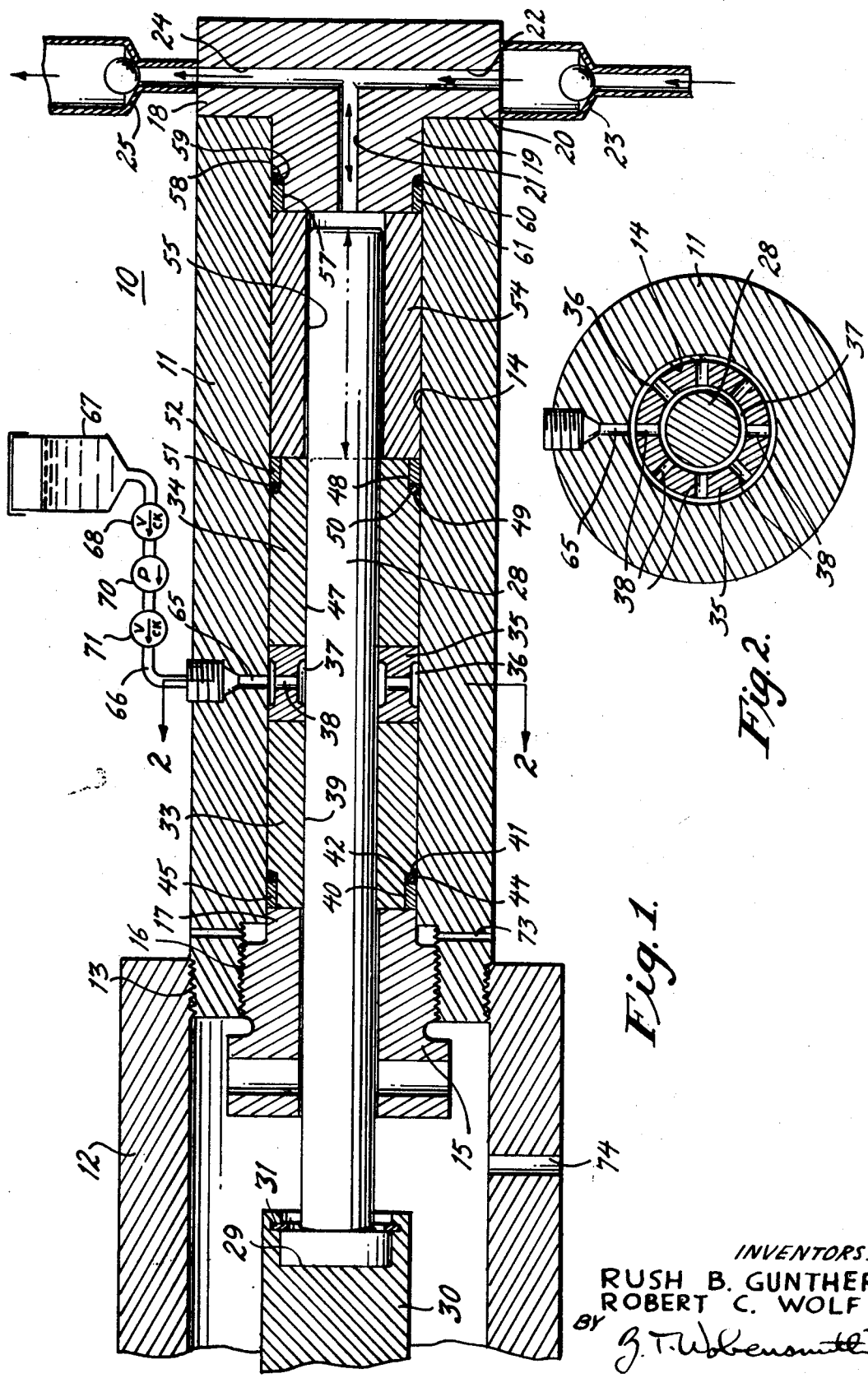

HIGH PRESSURE PUMP

BACKGROUND OF THE INVENTION

1. Field of the Invention

This invention relates to high-pressure reciprocating pumps and more particularly to such pumps having spaced seal bushings on the pump plunger with a fluid introduced therebetween and with controlled leakage of the fluid for lubrication and for the sealing of the plunger.

2. Description of the Prior Art

In the production of polyethylene the catalyst for use in converting ethylene into polyethylene is dispersed in a light hydrocarbon and pumped into the system at very high pressures. At an earlier period mineral oil which was much easier to pump was used in place of the light hydrocarbons.

In the pumping of the water for high velocity cutting operations as well as the production of polyethylene, pumping of fluids at pressures in the range from 50,000 to 100,000 p.s.i. is required. In pumping fluids at these pressures, and particularly with reciprocating pumps, difficulties have been encountered in connection with packing and seals employed to prevent leakage. Seals relying upon pressure applied thereto, including spring loaded packing and glands tightened packing have not proven satisfactory because of the friction of the seal with the reciprocating rod. Light hydrocarbons such as butane and hexane, and water are difficult to pump because of their low viscosity and lack of lubricating properties at high pressures of the range stated.

As has been proposed, for rotating shafts, to provide spaced balanced packing elements with pressure fluid introduced between the elements to provide lubricant films between the elements and the rotating shaft, a spring urged soft packing was required to prevent leakage into the pressure vessel along the rotating shaft.

Reciprocation of the shaft or plunger as is required for a reciprocating pump, with attendant friction of the packing and rod aggravates the demands made on the soft packing and rapid destruction of the packing is inescapable.

SUMMARY OF THE INVENTION

In accordance with the invention a high-pressure reciprocating pump is provided in which packing of the friction type at the moving parts is eliminated, spaced rigid seal bushings being provided on the plunger, one toward the process fluid being pumped and the other toward the atmosphere with predetermined diametrical clearances, and with a lubricating type fluid introduced under pressure and at a pressure exceeding that of the process fluid being pumped, the fluid tending to leak through the clearances but being controlled as to the rate of leakage by the orifices provided by the clearances. Static seals are provided at the exteriors of the seal bushings.

It is the principal object of the present invention to provide a high-pressure reciprocating pump having an improved character of plunger seal which does not require or employ friction packings at moving parts, which employs spaced orifice forming seal bushings on the plunger and with fluid supplied therebetween with controlled leakage along the plunger at the orifices.

It is a further object of the present invention to provide a high-pressure reciprocating pump with provisions for sealing which avoids friction and wear on packings engaging the plunger or other moving parts, and thereby has a long useful life with a minimum of maintenance.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a longitudinal sectional view of a high-pressure pump in accordance with the invention, parts being shown diagrammatically, and FIG. 2 is a transverse sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a high-pressure reciprocating pump in accordance with the invention is there shown at 10, with a cylinder 11, mounted in a pump frame 12 in any desired manner such as by a threaded connection 13.

The cylinder 11 has a longitudinal cylindrical bore 14 with a nut 15 at the operating end having a threaded connection 16 to the cylinder 11. The nut 15 has a cylindrical portion 17 which extends into the bore 14. The cylinder 11 at the liquid pumping end, is closed by a cover 18 which has a cylindrical portion 19 extending into the bore 14 and a head 20 extending radially outwardly at the end of the cylinder 11. The cover 18 is secured to the cylinder 11 in any desired manner, such as by studs (not shown).

The cover 18 has a T-shaped passageway 21 therein communicating with the bore 14, one branch 22 of the passageway 21 having inlet or suction check valve 23, illustrated diagrammatically mounted therein for admission of process fluid. Another branch 24 of the passageway 21 has a discharge check valve 25, illustrated diagrammatically mounted therein for the delivery of the process fluid.

A plunger 28 is provided, engaged in a socket 29 in a plunger holder 30 and held in the socket 29 by a split ring 31. The plunger holder 30 is reciprocated in any desired manner, such as by a crank and crosshead (not shown).

The plunger 28 extends through a central opening in the nut 15. Within the bore 14 outer and inner seal bushings 33 and 34 are provided. The bushings 33 and 34 are held in spaced relation by a spaced ring 35 having an outer circumferential passageway 36, an inner circumferential passageway 37 and radial connecting passageways 38.

The outer seal bushing 33 has an inner bore 39 and an outer circumferential end groove 40 with a terminal wall portion 41 which includes a curved face 42.

Disposed within the groove 40 and engaging the wall portion 41 and face 42 a static seal ring 44 is provided, of circular cross section, for sealing engagement with the bore 14. A compression and retaining ring 45 in the groove 40 is urged into seal effecting engagement with the seal ring 44 by the nut portion 17.

The inner seal bushing 34 is similar to the outer seal bushing 33, has an inner bore 47 and an outer circumferential end groove 48 with a terminal wall portion 49 which includes a curved face 50.

Disposed within the groove 48 and engaging the wall portion 49 and face 50, static seal ring 51 is provided of circular cross section for sealing engagement with the bore 14. A compression and retaining ring 52 in the groove 48 is urged into seal effecting engagement with the seal ring 51 by a filler piece 54 of hollow cylindrical configuration which is disposed in the bore 14 and has a central longitudinal opening 55 within which the plunger 28 is longitudinally movable.

The cover portion 19 has an outer circumferential end groove 57 with a terminal end wall portion 58 which includes a curved face 59.

Disposed within the groove 57 and engaging the wall portion 58 and face 59, a static seal ring 60 is provided of circular cross section, for sealing engagement with the bore 14. A compression and retainer ring 61 in the groove 57 is urged into seal effecting engagement with the seal ring 60 by the engagement of the filler piece 54 therewith.

The seal bushings 33 and 34 are preferably made of cast iron, bronze, tungsten carbide, aluminum oxide or other suitable materials selected for their antigalling properties.

Tungsten carbide is preferred because of its stiffness which reduces the ratio of the outside diameter to the inside diameter of the bushings 33 and 34. The reduction in spaced for higher pressure use is desirable since lower modulus materials result in undue thickness.

The inner bore 39 of the bushing 33, and the inner bore 47 of the bushing 34 and the exterior diameter of the plunger 28 are such that when fluid pressure is applied on the bushings 33 and 34 as is explained below, a predetermined orifice size or clearance will be provided. Typical, diametrical clearances are from five ten-thousandths to one one-thousandth of an inch.

The seal rings 44, 51 and 60 are of metal such as cast iron, bronze or tungsten carbide to withstand a wide range of oscillating fluid pressure thereon which may range from a suction pressure of the process fluid of 30 to 50 p.s.i. to the delivered pressure of 50,000 p.s.i. or higher.

The cylinder 11 has a passageway 65 in communication with the bore 14 at the location of the passageway 36 of the spaced ring 35 with which a fluid connection 66 is connected. A reservoir 67 is connected through an inlet check valve 68, pumps 70 and delivery check valve 71 to the fluid connection 66.

A seal fluid compatible with the process fluid being pumped and capable of providing a hydrodynamic film of lubrication at the bores 39 and 47 is provided in the reservoir 67 and the pump 70 is operated to supply the fluid from the reservoir 67 between the bushings 33 and 34 at a pressure which is in excess of the delivery pressure of the process fluid being pumped.

The cylinder 11, at the inner end of the threaded connection 16 is preferably provided with weep holes 73 for discharge of any fluid leaking to this location and indicative of leakage at the seal ring 60.

The frame 12, exteriorly of the U-nut 15 is preferably provided with weep holes 74 for discharge of any fluid leaking to this location and indicating the effectiveness of the controlled leakage to this location.

Upon reciprocation of the plunger 28, process fluid entering through the check valve 23 will be discharged at increased pressure through the check valve 25 which delivery pressure can be of the order of 50,000 to 100,000 p.s.i.

The seal ring 60 prevents leakage of the process fluid from the bore 14 between the cover portion 19 and the cylinder 11.

The seal ring 51 prevents leakage of the process fluid from the bore 14 between the seal ring 34 and the cylinder 11 and prevents the seal fluid from leakage at this location.

The seal ring 44 prevents leakage of seal fluid at this location.

The seal fluid delivered from the pump 70 is preferably at a constant pressure and upon its delivery through the fluid connection 66 and fluid passageway 67 is effective in both directions on the exteriors of the bushings 33 and 34 causing them to reduce the original clearance which existed at the bores 39 and 47 and along the plunger 28 at these bores. A limited quantity of the seal fluid is permitted to flow along the plunger 28 in each direction from the spacer ring 35 and the orifices provided by the clearances between the plunger 28 and the seal bushings 33 and 34 at the bores 39 and 47. A portion of the seal fluid will be introduced into the process fluid, the seal fluid as previously mentioned being selected to be compatible therewith. A portion of the seal fluid will escape and its discharge will be observable at the weep openings 74.

The delivery pressure of fluid from the pump 70 can be adjusted to control these clearances. Increasing the pressure will load the bushings 33 and 34 from the outside and reduce the size of the orifices at the bores 39 and 47. The fluid which is permitted to leak along these orifices serves as a hydrodynamic film of lubricant between the seal bushings 33 and 34 and the plunger 28 which is virtually frictionless so that heat generation at these locations is minimal. Cooling as required for conventional packings is rendered unnecessary although it could be employed if the process fluid is of such temperature level as to render it desirable.

The leakage is preferably controlled so that it amounts only to a few cubic centimeters per hour.

It will thus be seen that the pump has been provided which attains the objects of the invention.

We claim:

1. A pump comprising
   a cylinder having a continuous longitudinal bore with a working end and a process fluid pumping end,
   fluid inlet and delivery valves for said pumping end of said cylinder,
   a plunger reciprocable in said cylinder,
   axially disposed seal bushings in said cylinder bore and intermediate said cylinder ends and each having interior bores within which said plunger is movable,
   a clearance between said plunger and said interior bores of said bushing providing orifices for fluid lubricant delivery towards said ends of said interior bores,
   means for supplying fluid lubricant under pressure to said orifices,
   a seal supporting member at the working end of said cylinder and through which said plunger is reciprocable,
   said seal support member having a transverse face with which one end of one of said seal bushings is in engagement,
   a static seal at said end of said seal bushing contiguous to said seal supporting member between the exterior of said seal bushing and said cylinder bore,
   said process fluid pumping end of said bore being closed by an end cover member,
   a hollow cylindrical filler member in said cylinder bore between and in engagement 17 cover with said cover member and the other of said seal bushings and in the interior of which said plunger is reciprocable, and
   a static seal at the end of said other seal bushing contiguous to said filler member between the exterior of said other seal bushing and said cylinder bore.

2. A pump as defined in claim 1 in which
   said seal supporting member is a nut and said nut is engaged with said cylinder.

3. A pump as defined in claim 1 in which
   said end cover member has a portion extending into said bore.

4. A pump as defined in claim 3 in which
   a static seal is provided between said portion of said end cover member and said bore.

5. A pump as defined in claim 1 in which
   said means supplying fluid under pressure includes a member delivering fluid at a pressure higher than the delivered pressure of the process fluid.

UNITED STATES PATENT OFFICE
CERTIFICATE OF CORRECTION

Patent No. 3,602,613      Dated August 31, 1971

Inventor(s)    Rush B. Gunter  -  Robert C. Wolf

It is certified that error appears in the above-identified patent and that said Letters Patent are hereby corrected as shown below:

Claim 1, column 4, line 45, after "engagement" delete -17 cover-

Signed and sealed this 11th day of January 1972.

(SEAL)
Attest:

EDWARD M. FLETCHER, JR.
Attesting Officer

ROBERT GOTTSCHALK
Acting Commissioner of Patents